United States Patent
Shuey

(10) Patent No.: US 7,071,742 B2
(45) Date of Patent: Jul. 4, 2006

(54) POWER SUPPLY RESTART DELAY PREVENTION CIRCUIT

(75) Inventor: Kenneth C. Shuey, Zebulon, NC (US)

(73) Assignee: Elster Electricity, LLC, Raleigh, NC (US)

( * ) Notice: Subject to any disclaimer, the term of this patent is extended or adjusted under 35 U.S.C. 154(b) by 9 days.

(21) Appl. No.: 10/867,955

(22) Filed: Jun. 15, 2004

(65) Prior Publication Data
US 2005/0275443 A1 Dec. 15, 2005

(51) Int. Cl.
H03L 7/00 (2006.01)
(52) U.S. Cl. .................. 327/143; 323/901; 327/110; 363/491
(58) Field of Classification Search ............... 327/110, 327/108, 143, 539, 545; 363/491; 323/901, 323/902
See application file for complete search history.

(56) References Cited

U.S. PATENT DOCUMENTS

| | | | | |
|---|---|---|---|---|
| 4,471,418 | A | * | 9/1984 | Tuma ...................... 363/21.07 |
| 5,675,485 | A | * | 10/1997 | Seong ......................... 363/97 |
| 5,812,383 | A | * | 9/1998 | Majid et al. ............. 363/21.05 |
| 5,995,384 | A | * | 11/1999 | Majid et al. ............. 363/21.18 |
| 6,125,046 | A | * | 9/2000 | Jang et al. ............... 363/21.15 |

OTHER PUBLICATIONS

Power Integrations®, Inc., "Top 100-4 TOPSwitch® Family-Three-terminal Off-Line PWM Switch", Jul. 1996, Power Integrations, Inc. 477 N. Mathilda Ave, Sunnyvale, CA 94086, 20 Pages.
Power Integrations®, Inc., "Top 200-4/14 TOPSwitch® Family-Three-terminal Off-Line PWM Switch", Jul. 1996, Power Integrations, Inc. 477 N. Mathilda Ave, Sunnyvale, CA 94086, 16 Pages.
Power Integrations®, Inc., "Top 209/210 TOPSwitch® Family-Three-terminal Off-Line PWM Switch", Aug. 1997, Power Integrations, Inc. 477 N. Mathilda Ave, Sunnyvale, CA 94086, 16 Pages.
Power Integrations®, Inc., "Top 221/227 TOPSwitch®-II Family-Three-terminal Off-Line PWM Switch", Jul. 2001, Power Integrations, Inc. 477 N. Mathilda Ave, Sunnyvale, CA 94086, 20 Pages.

* cited by examiner

*Primary Examiner*—Terry D. Cunningham
*Assistant Examiner*—Thomas J Hiltunen
(74) *Attorney, Agent, or Firm*—Woodcock Washburn LLP

(57) ABSTRACT

The auto-restart characteristic of a controller is prevented. A circuit comprises a voltage control loop, a control winding, an optical isolator component, and a diode biasing network. In the case of a power outage, the current from the voltage control loop begins to drop, resulting in the optical isolator component coming out of conduction. The optical isolator component coming out of conduction cuts off current to the control input of the controller. The removal of current causes the control winding voltage to drop, removing current from the diode biasing network, resulting in the removal of a bias voltage from the control pin of the controller. This removal results in the drop of the received voltage at the control pin, such that the received voltage is never in the trigger range of the auto-restart characteristic. Consequently, on reapplication of power, the controller achieves normal startup time.

17 Claims, 3 Drawing Sheets

POWER SUPPLY RESTART DELAY PREVENTION CIRCUIT

FIELD OF THE INVENTION

This invention relates to power supply controller chips. More particularly, the invention relates to a circuit for the prevention and elimination of an auto-restart characteristic of a controller chip.

BACKGROUND OF THE INVENTION

Commercial and industrial electronic meters are now including communication devices to allow for remote interrogation and remote meter reading. These communication products place increased pressure on the internal power supply to deliver large currents under a variety of different operating conditions. Wide range power supplies designed for commercial and industrial meters may have to operate as low as 46 VAC and as high as 530 VAC while delivering hundred of milliamperes of current.

As a result, many of the new power supply switching controller chips are designed for a variety of different applications and are not necessarily compatible with every aspect of an electronic meter's requirements. Such an area of concern is the auto-restart for controllers, such as the Power Integrations Topswitch® product. The controller chip is designed to be able to handle short circuit fault conditions that could result from battery charger applications and other special cases. The net result is that the controller chip can offer undesirable performance under certain operating conditions within the meter.

What is needed are circuits and methods that eliminate the auto-restart function in controller chips, such as the Power Integrations Topswitch® product.

SUMMARY OF THE INVENTION

The present invention provides circuits and methods for elimination of the auto-restart characteristic of a controller (such as the Topswitch®) and for providing startup delays that are consistent across a variety of power outage situations. While exemplary embodiments are described with respect to the Topswitch® controller, the present invention is applicable to any controller that implements auto-restart in a similar fashion to the Topswitch®.

A circuit in accordance with the present invention is connected to the control input of the controller. The circuit and the controller are connected to a power supply. In the case of a temporary power outage from the power supply, the voltage received at the control input determines the startup behavior of the controller when power is reapplied. For example, if a voltage between 4.8 and 5.8 volts is received on the control pin of the controller, the controller, after reapplication of power from the power supply, will enter the auto-restart or soft start condition. As a result, the controller will restart with a greater startup time than it would have had the auto-restart condition not been triggered.

In order to prevent the auto-restart condition and achieve normal startup time for a variety of applications, the circuit of the present invention prevents a received voltage within a predetermined trigger range (e.g., between about 4.8 and 5.8 volts) at the control input. An embodiment of the circuit comprises a voltage control loop, a control winding, an optical isolator component and a diode biasing network. The voltage control loop desirably creates a current that is received by the optical isolator component. If the output voltage reaches the operating threshold voltage, a current flows from the control winding into the control input of the controller. The diode biasing network desirably creates a bias voltage that is also received at the control input along with input from the power supply.

In the case of a power outage, the current created in response to the voltage control loop desirably begins to drop, resulting in the opto transistor, of the optical isolator component, coming out of conduction. When the opto transistor shuts off, the feedback current to the control input is removed. When the control current to the controller is removed, the controller stops switching and both the output voltage and the control winding voltage drop. When the control winding voltage is removed, current to the diode biasing network is removed, resulting in the immediate removal of the bias voltage to the control input. This removal results in the immediate drop of the received voltage at the control pin, such that the received voltage is not stable within the trigger range of the auto-restart characteristic. Consequently, on reapplication of power, the controller achieves normal startup time. Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
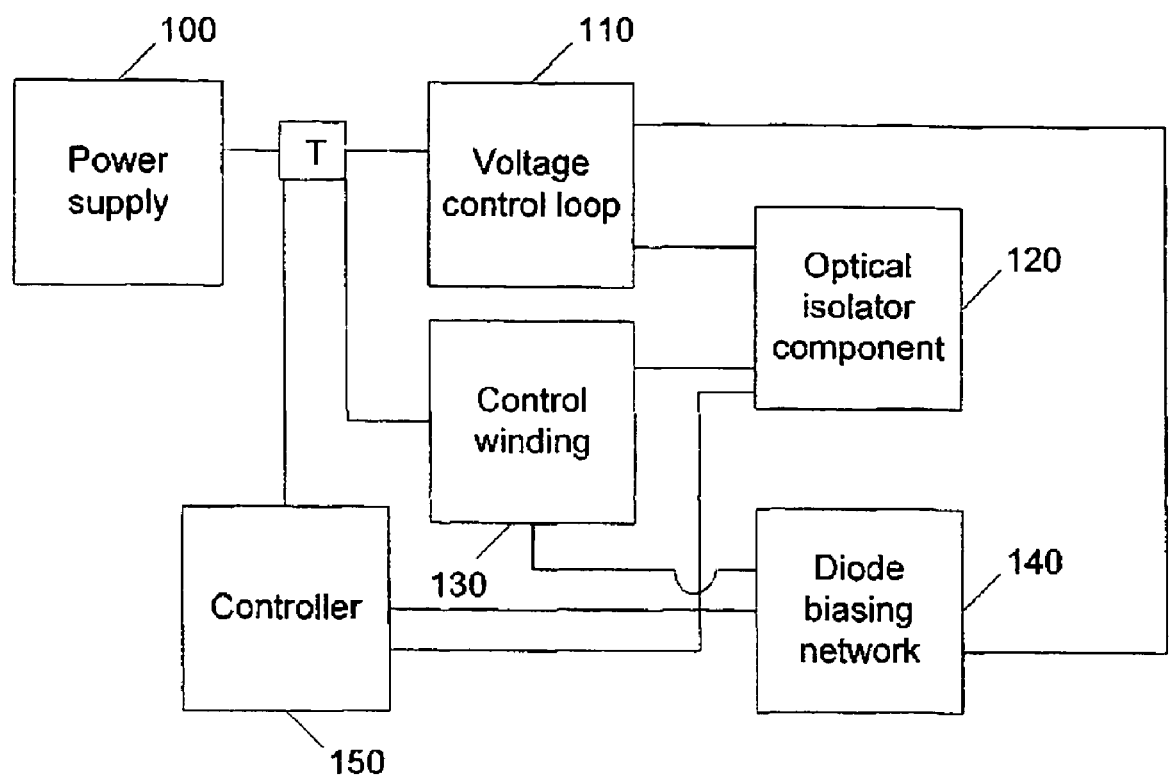
FIG. 1 is a block diagram illustrating an exemplary system in accordance with the present invention.

FIG. 1 is a block diagram illustrating an exemplary system in accordance with the present invention. A power supply 100, such as a direct current (DC) power supply, provides power to the circuit. A transformer T is connected between the power supply 100 and a controller 150, such that a voltage control loop 110 and a control winding 130 are developed. A diode biasing network 140 is provided, along with optical isolator component 120.

The control winding 130 desirably provides current for the biasing network 140. The voltage control loop 110 desirably provides the current to the control input of the controller 150 through the optical isolator component 120. The diode biasing network 140 desirably creates the bias voltage that is received as part of a control voltage.

Figure 2:
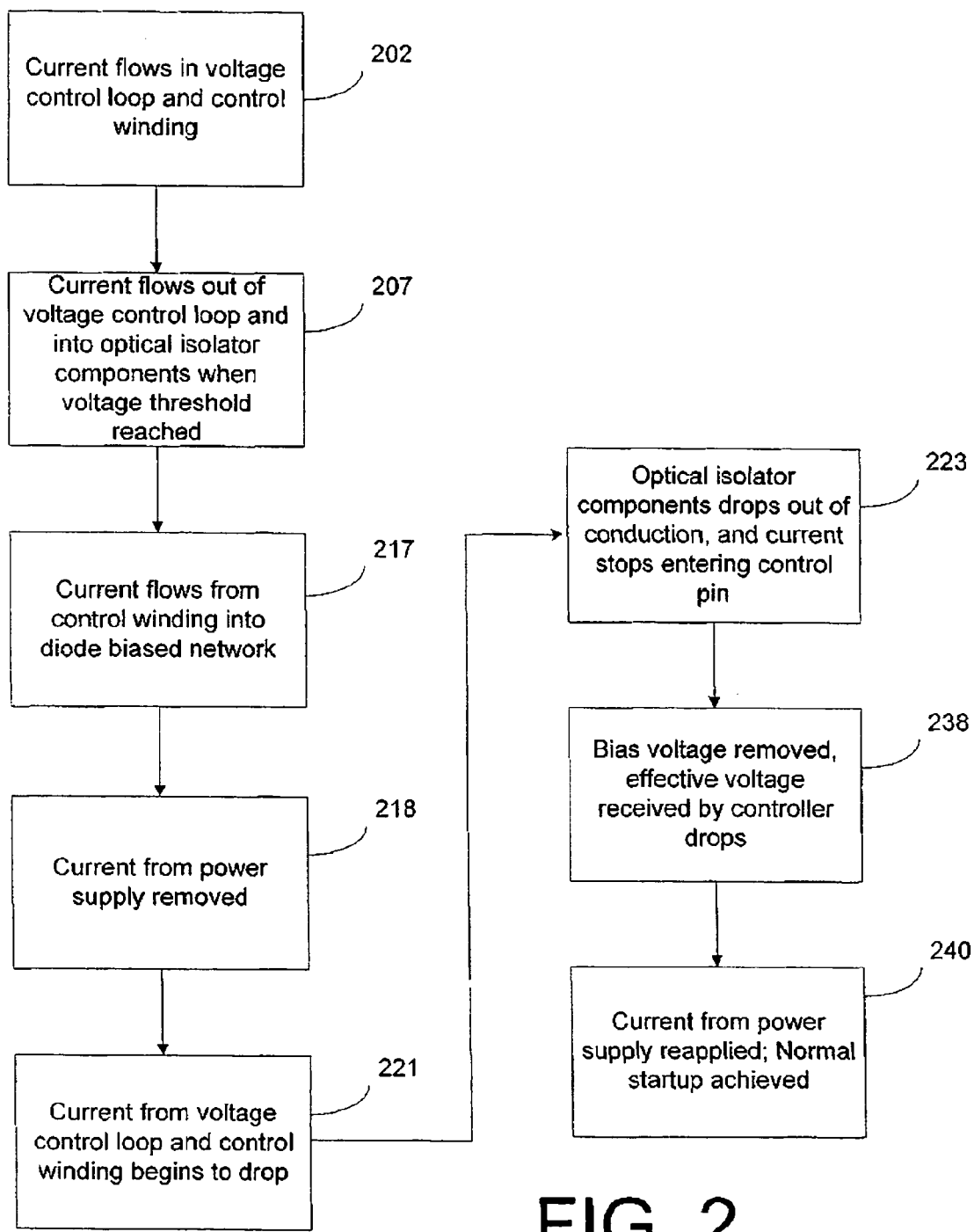
FIG. 2 is a flow diagram illustrating an exemplary method in accordance with the present invention.

FIG. 2 is a flow diagram illustrating an exemplary method in accordance with the present invention. A power supply 100 provides current to a transformer T. As a result, current begins to flow in the control winding 130, and the voltage control loop 110. When a certain threshold voltage is reached in the voltage control loop 110, current flows out of the loop and into optical isolator component 120. The optical isolator component 120, upon receiving the current, permits current to flow out of control winding 130 and into the control input of the controller 150. The diode biasing network 140, using received current from the control winding 130, applies a bias voltage to the controller 150.

At a later time, the power supply 100 temporarily removes the supplied current, causing the current in the control winding 130 and the voltage control loop 110 to decrease. This removes current from the optical isolator component 120 and immediately eliminates the current to the diode biasing network 140. As a result, the bias voltage is removed from the controller 150, causing an immediate drop in the effective voltage received at the controller 150. The immediate drop in voltage desirably avoids the auto-restart delay characteristic of the controller, and normal startup time is achieved when current flow resumes from the power supply 100.

More particularly, at 202, a current is generated by the power supply 100. This current flows through the transformer T, causing a current to flow inside the voltage control loop 110 and the control winding 130.

At 207, the voltage has reached a certain threshold value inside the voltage control loop 110. As a result, current begins to flow out of the voltage control loop 110 into the optical isolator component 120. In addition, current is received by the controller 150.

At 217, current flows out of the control winding 130 into the diode biasing network 140. The current through the diode biasing network 140 desirably creates a bias voltage that is received at the controller 150.

At 218, current from the power supply 100 is removed.

At 221, as a result of the removal of the current from the power supply 100, the current stops flowing in transformer T. Consequently, the current flowing out of the control winding 130 and the voltage control loop 110 begins to decrease.

At 223, the drop of current from the voltage control loop 110 desirably causes the optical isolator component 120 to come out of conduction, effectively eliminating the current into the controller 150.

At 238, the removal of current from the circuit causes the control winding 130 to cease producing current, which eliminates the current flowing into the diode biasing network 140 from the control winding 130. The removal of current causes the bias voltage, previously applied by the diode biasing network 140 to the controller 150, to immediately drop to zero. The removal of the bias voltage causes a dramatic drop off of the effective voltage into the controller 150.

The voltage drop desirably prevents the voltage received at controller 150 from being within the voltage range (e.g., about 4.8 to 5.8 volts) that would trigger the auto-restart delay feature of the controller 150 on reapplication of current from the power supply 100. Once current stops flowing from the power supply 100, the voltage received by the controller 150 immediately drops below the auto-restart delay threshold, effectively circumventing the feature.

At 240, the current is reapplied from the power supply 100. When current is reapplied, the normal startup of the controller is desirably achieved.

Figure 3:
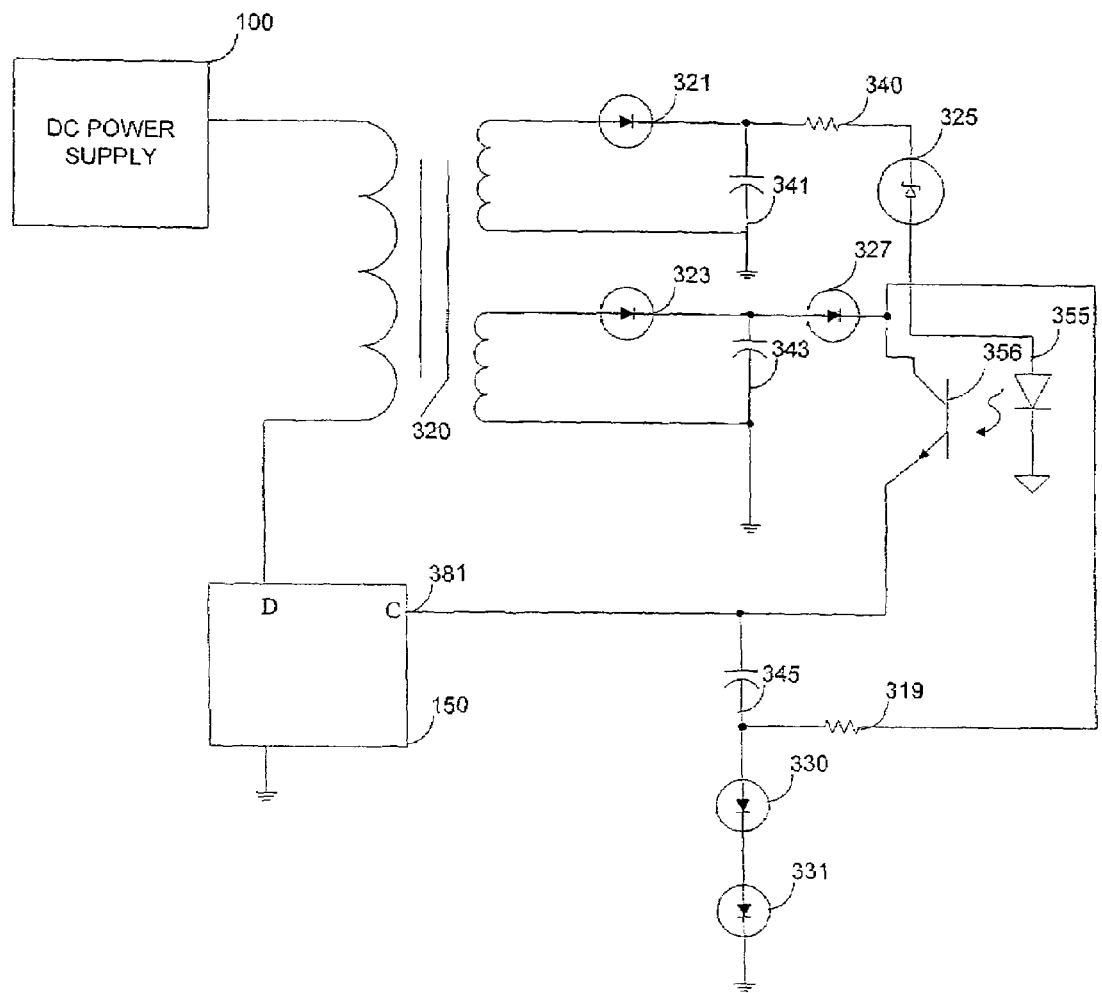
FIG. 3 is a schematic diagram of an exemplary circuit in accordance with the present invention.

FIG. 3 is a schematic diagram of an exemplary power supply restart delay prevention circuit in accordance with the present invention. The exemplary circuit includes a DC power supply 100 that feeds current into a controller 150, such as a Topswitch® controller chip. The controller chip 150 typically includes a Metal Oxide Semiconductor Field Effect Transistor ("MOSFET") with a restart behavior that depends on the voltage into the control input pin 381. The voltage into the control input pin 381 is partially determined by a bias voltage supplied through the diodes 330, 331, and current received from the output voltage at filter capacitor 343. The diodes 330, 331 receive current through the control winding, diode 323, filter capacitor 343, diode 327 and resistor 319. A loss of current from power supply 100 causes voltage from the filter capacitor 343 to rapidly drop. This drop removes current from diodes 330, 331, and results in an immediate removal of the bias voltage into control pin 381. The removal of the bias voltage desirably drops the total received voltage at the control pin 381 outside of the trigger range of the auto-restart mechanism.

Capacitor 345 is the "control capacitor" that determines to a large extent the startup time characteristics and the AC voltage at which the controller will operate at a given load. It is desirable that the capacitor 345 be large enough to allow the controller to operate at a low input AC voltage. It may be appreciated that using a control capacitor 345 with a large capacitance value, for example about 470 microfarads, in combination with the biasing technique discussed herein, can still provide fast startup times for virtually all outage conditions. The control capacitor 345 is desirably in the range of about 330–470 microfarads.

The optical isolator component 120 desirably comprises an opto diode and an opto transistor, represented on FIG. 3 at elements 355 and 356. The opto diode 355 receives a control current from the voltage control loop 110. The opto diode 355 controls current flow out of the control winding 130 by only allowing current to flow out of the opto transistor 356 if sufficient current is received from the voltage control loop 110 at the opto diode 355. In one embodiment, the optical isolator component 120 can comprise model CNY 17-4 from Fairchild Semiconductor®.

The control winding 130 desirably comprises diode 323 and capacitor 343, and provides a current that is used to create a bias voltage in series with the control capacitor 345. A current is generated in the control winding 130 off of transformer 320. The control winding 130 also provides current that flows through the opto transistor 356, into the control input 381 of the controller. This current is desirably controlled by the optical isolator component 120.

The voltage control loop 110 desirably comprises capacitor 341, resistor 340, and diode 321. The voltage control loop 110 provides a current that controls, through the optical isolator component 120, the current that is received by the controller chip 150 at the control pin 381. The voltage control loop 110 desirably controls the current flow from the control winding 130.

A current is generated in the voltage control loop 110 off of transformer 320. When a certain voltage has been reached across capacitor 341, a current begins to flow out of the voltage control loop 110, through diode 325 and into opto diode 355. The current through the opto diode 355 activates the opto transistor 356, and allows the current to flow from the control winding 130 into the control capacitor 345. It is desirable that the voltage across capacitor 341 be approximately the same value as the voltage across capacitor 343 from the control winding 130. The capacitor 341 is desirably about 2200 microfarads to provide filtering of typical load and sufficient hold up time of the output voltage. The resistor 340 is desirably about 220 ohms to provide a slight amount of voltage drop proportional to the voltage needed by the optical isolator component 120. The diode 321 is desirably a US1G high speed, 1 ampere, 600 volt diode to handle the switching characteristics of the power supply.

The diode biasing network 140 desirably comprises two diode drops 330 and 331, and adds to the voltage across the control capacitor 345. The diode drops 330, 331 are fed by the current from the output of capacitor 343 of the control winding 130. The diode biasing network 140 desirably provides the bias voltage in series with control capacitor 345, thereby causing the nominal voltage on control capacitor 345 to drop (e.g., to be reduced by about 1.2 volts in an exemplary embodiment). For example, if the normal operating voltage is about 5.8 volts on the control pin 381, the voltage on control capacitor 345 will desirably be reduced to approximately 4.6 volts.

The control winding 130, voltage control loop 110, optical isolator component 120, and the diode biasing network 140 effectively eliminate the auto-restart behavior of the controller chip 150. The controller chip 150 enters the auto-restart state when a voltage is applied to the control pin 381 between a certain range (e.g., between about 4.8 and 5.8 volts). The auto-restart is time consuming, which is undesirable. An exemplary circuit of the present invention avoids the auto-restart state by effectively controlling the voltage across the control pin 381 so that the auto-restart voltage is never reached (i.e., for example, a voltage between about 4.8 and 5.8 volts is never applied) during power down conditions.

When a temporary power outage or interruption occurs from the DC power supply 100, there is a resulting drop in current coming from the voltage control loop 110 and the control winding 130. This drop in current causes the opto diode 355 of the optical isolator component 120 to come out of conduction which opens the opto transistor 356. The opening of the opto transistor 356, results in the immediate removal of control current to input 381 of the controller chip. This removal of current causes the control winding 130 to drop in voltage, eliminating the bias voltage from the diode biasing network 140. As a result, the control voltage received by the controller 150 at control pin 381 drops.

For example, if the control voltage received at control pin 381 was previously at 5.8 volts, the control voltage will immediately drop (e.g., drop by 1.2 volts) to 4.6 volts. Removal of the bias voltage creates a step down of about 1.2 volts, effectively preventing the controller chip 150 from receiving the necessary voltage of between about 4.8 and 5.8 volts to trigger the auto-restart behavior. Thus, when current resumes from the DC power supply 100, the controller chip 150 will not trigger an auto restart condition because the voltage on control pin 381 was never within the range of about 4.8 and 5.8 volts.

It should be understood that the inventive principles described in this application are not limited to the components or configurations described in this application. It should be understood that the principles, concepts, systems, and methods shown in this application may be practiced with software programs written in various ways, or different equipment than is described in this application without departing from the principles of the invention.

The invention may be embodied in the form of appropriate computer software, or in the form of appropriate hardware or a combination of appropriate hardware and software without departing from the spirit and scope of the present invention. Further details regarding such hardware and/or software should be apparent to the relevant general public. Accordingly, further descriptions of such hardware and/or software herein are not believed to be necessary.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed is:

1. A circuit comprising:
   a control capacitor for providing a voltage to a controller chip at a control pin, the controller chip having an auto-restart property, wherein when the voltage presented to the controller chip drops a predetermined amount, the controller chip is prevented from activating the auto-restart property;
   a control winding for providing a current to generate a bias voltage of about 1.2 volts;
   an optical isolator component for controlling current flow from the control winding to the controller chip;
   a diode biasing network for generating the bias voltage from the control winding and applying the bias voltage to the control capacitor; and
   a voltage control loop for providing current to the optical isolator component.

2. The circuit of claim 1, wherein the optical isolator component comprises an opto diode and an opto transistor.

3. The circuit of claim 2, wherein the opto diode is connected to the voltage control loop in series.

4. The circuit of claim 2, wherein the opto transistor is connected to the control winding in series.

5. The circuit of claim 2, wherein the control winding is connected to the diode biasing network in series.

6. The circuit of claim 2, wherein the opto diode prevents current flow from the control winding through the opto transistor if the provided current from the voltage control loop is less than a threshold voltage.

7. The circuit of claim 1, wherein the voltage control loop comprises at least one capacitor.

8. The circuit of claim 1, wherein the control winding comprises at least one capacitor.

9. The circuit of claim 1, wherein the diode biasing network comprises a plurality of diodes connected in series.

10. The circuit of claim 1, wherein the control capacitor is connected to the diode biasing network in series.

11. An auto-restart prevention method, comprising:
    receiving a first current from a power supply at the controller chip and at a circuit, wherein the circuit comprises a control winding, a voltage control loop, a diode biasing network, an optical isolator component, and a transformer; and
    dropping a received voltage at the controller chip below an auto-restart threshold by removing a bias voltage of about 1.2 volts in response to a loss of the first current and preventing the controller chip from auto-restarting.

12. The method of claim 11, further comprising reapplying the first current to the controller chip and the circuit, and achieving normal startup behavior of the controller chip.

13. The method of claim 11, wherein the auto-restart threshold is between about 4.8 and about 5.8 volts.

14. The method of claim 11, wherein the diode biasing network generates a bias voltage from a second current received from the control winding.

15. The method of claim 11, wherein dropping a received voltage at the control chip below an auto-restart threshold in response to a loss of the first current is caused by removing a second current to the diode biasing network.

16. The method of claim 15, wherein the second current is generated in the control winding by the transformer.

17. The method of claim 15, wherein the optical isolator component removes the second current from the diode biasing network after receiving a voltage below a threshold voltage from the voltage control loop.

* * * * *